United States Patent [19]
Yamamoto et al.

[11] Patent Number: 5,829,545
[45] Date of Patent: *Nov. 3, 1998

[54] SNOWMOBILE

[75] Inventors: Kazuhiro Yamamoto; Takao Kouchi; Shizuo Kawano; Tadaaki Nagata; Hideaki Suzuki, all of Saitama, Japan

[73] Assignee: Honda Giken Kogyo Kabushiki Kaisha, Tokyo, Japan

[ * ] Notice: The term of this patent shall not extend beyond the expiration date of Pat. No. 5,586,614.

[21] Appl. No.: 476,333

[22] Filed: Jun. 7, 1995

[30] Foreign Application Priority Data

Sep. 22, 1994 [JP] Japan .................................. 6-254241

[51] Int. Cl.⁶ .................................................. B62D 55/06
[52] U.S. Cl. .......................... 180/190; 180/193; 305/116; 305/128
[58] Field of Search ..................... 180/190, 191, 180/193, 9.5, 9.54, 9.1, 9.25; 305/116, 127, 128, 129, 193

[56] References Cited

U.S. PATENT DOCUMENTS

| | | | |
|---|---|---|---|
| 3,623,564 | 11/1971 | Higginbotham | 180/190 |
| 3,744,583 | 7/1973 | Bedard | 305/128 |
| 3,765,498 | 10/1973 | Rogerson | 180/190 |
| 3,858,949 | 1/1975 | Russ et al. | 305/127 |
| 3,893,526 | 7/1975 | Esch | 305/127 |
| 4,364,447 | 12/1982 | Yoshida | 180/190 |
| 5,586,614 | 12/1996 | Kouichi et al. | 180/190 |

FOREIGN PATENT DOCUMENTS

58-26684   8/1981   Japan .

Primary Examiner—Anne Marie Boehler
Attorney, Agent, or Firm—Birch, Stewart, Kolasch & Birch, LLP

[57] ABSTRACT

A snowmobile having a crawler belt operatively connected to a drive wheel, slide rails and guide wheels supported by the slide rails, the slide rails including a main slide rail arranged at approximately a midportion of the crawler belt, and a pair of right and left side slide rails arranged along outside side edges of the crawler belt, the guide wheels being arranged between the main slide rail and the side slide rails.

17 Claims, 13 Drawing Sheets

BACKGROUND ART

SNOWMOBILE

BACKGROUND OF THE INVENTION

1. Field of the Invention

The present invention relates to a snowmobile capable of operating on snow by use of a crawler belt.

2. Description of Background Art

A snowmobile which operates by having a crawler belt pressed against the surface of the snow is disclosed in Japanese Patent Publication No. H1-24673.

This snowmobile is equipped with a drive wheel rotated by an engine, slide rails attached to the rear end of a swing arm, and guide wheels supported by the slide rails and is able to operate on snow by means of a crawler belt passed around the drive wheels, slide rails and guide wheels in a state of tension with the crawler belt being pressed against the surface of the snow.

Figure 15:
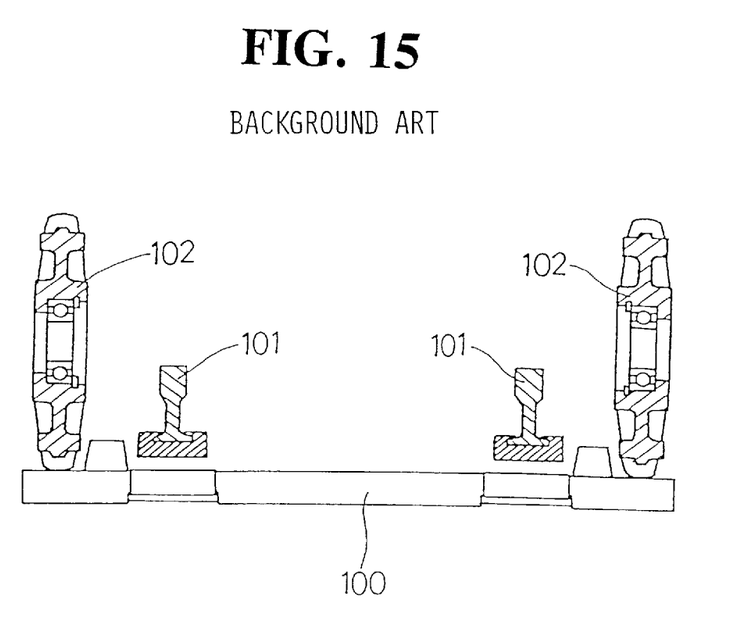
FIG. 15 is a view showing the positional relations between the slide rails and the guide wheels of the prior art example when viewed in the longitudinal direction of the snowmobile.

FIG. 15 is a view showing the positional relations between the slide rails and the guide wheels of the aforementioned conventional snowmobile when viewed from the longitudinal direction of the snowmobile wherein a pair of right and left slide rails 101 and 101 are respectively disposed at positions located inwardly of the outer side ends of a crawler belt 100 and guide wheels 102 and 102 are arranged at lateral outer sides of the crawler belt 100 than the slide rails 101 and 101, so as to press the lower surface of the crawler belt 100 against the snow surface.

In the snowmobile equipped with the aforementioned conventional crawler belt, the outer side edges of the crawler belt are depressed onto the snow surface. However, the guide wheels are circular, and the space between front and rear guide wheels is large. Therefore, when the snowmobile is turned by banking it with respect to the snow surface, the running resistance of one side portion of the crawler belt becomes larger than that of the other so that the crawler belt deflects at the widthwise inner end portions located between the guide wheels, with respect to its turning direction. As a result, the crawler belt fails to have its facial pressure uniform with respect to the snow surface so that its driving force is not effectively transmitted.

In case the snowmobile is wholly turned by banking (inclination), it has been observed that when the snowmobile is inclined, the lower surface of the body cover contacts the surface of the snow so that the front ski is freed from its snow contacting load and the snowmobile is not held firm on the snow.

Further, the bias member and the ski are welded or jointed by means of bolts and nuts. In case the snowmobile is turned with a bank, the banking action of the snowmobile body by the driver is delayed a moment by the resistance of the snow surface to the ski so that the turning action is hard to time.

SUMMARY AND OBJECTS OF THE INVENTION

The present invention has been made to improve the snow-contact resistance of a snowmobile and the banking (or turning) property of the snowmobile. According to a first aspect of the present invention, there is provided a snowmobile having a crawler belt tensed along a drive wheel, slide rails and guide wheels supported by the slide rails, wherein said slide rails include a main slide rail arranged at a central midportion of the crawler belt, and a pair of right and left side slide rails arranged at the lateral side edges of the crawler belt, and the guide wheels are arranged between the main slide rails and the side slide rails.

According to a second aspect of the present invention, there is provided a snowmobile having a crawler belt tensed along a drive wheel, slide rails and guide wheels supported by the slide rails, and its outer side covered with a body cover, wherein the body cover is equipped on the right and left of its lower surface with edge portions which extend longitudinally and project downward.

According to a third aspect of the present invention, there is provided a snowmobile having a crawler belt tensed along a drive wheel, slide rails and guide wheels supported by the slide rails, and a ski hinged to the front portion of its body through a biasing member, and elastic members are interposed between said biasing member and said ski.

Since the side slide rails are arranged close to the outer side edges of the crawler belt, the entire snow contacting surface of the belt becomes uniform. Moreover, since the body cover is equipped on the right and left sides of its lower surface with the downwardly projecting edge portions, these edge portions sink into the snow when the snowmobile turns. In addition, since the rubber bushings (or elastic members) are interposed between the biasing member and the ski, the lateral inclination of the ski due to the elasticity of the rubber bushings is allowed with respect to the biasing member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

An embodiment of the present invention will be described with reference to the accompanying drawings.

Figure 1:
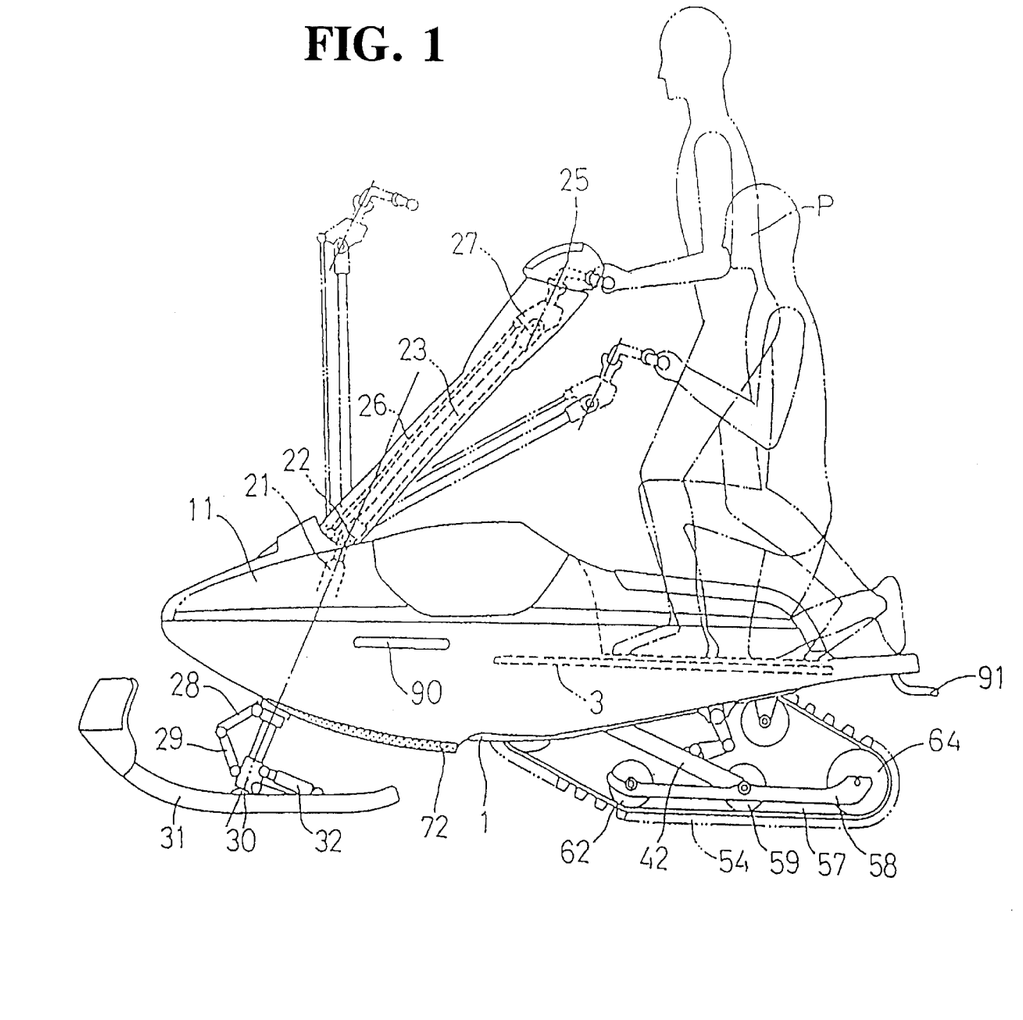
FIG. 1 is an overall side elevation of a snowmobile according to the present invention.

The snowmobile includes a main frame 1 made of a pipe, an upper frame 2 provided at the front portion of the main frame 1, a floor 3 interposed between the rear of the upper frame 2 and the rear end of the main frame 1 so as to serve as a frame body and a heat exchanger. To the front end portions of the main frame 1 and the upper frame 2, there is attached a head pipe 4. In the space enclosed by the main frame 1 and the upper frame 2, there is mounted an engine 5. At the back of the engine 5, there is arranged a transmission case 6. Over this transmission case 6, there are arranged an air cleaner 7, a carburetor 8 and a fuel tank 9. To the front surface of the head pipe 4, there is attached a muffler 10. These members are all covered with a body cover 11.

Further, grip portions 90 project from both side surfaces of the body cover 11 and a grip portion 91 is attached to the rear end portion of the floor 3.

In the aforementioned head pipe 4, there is inserted a front cushion unit 20. To the upper end of this front cushion unit 20, there is connected a lower member 21 of a steering post. To the upper end of the lower member 21, there is connected through a universal joint 22 an upper member 23 of the steering post. To the upper end of this upper member 23, there is connected through a universal joint 24 a handle 25. In front of and in parallel with the upper member 23, there is arranged a steering link 26 which has its lower end portion pivoted to the body of the snowmobile so that it can rock in a vertical plane. To the upper end of the steering link 26, there is connected a bracket 27 of the handle 25. The upper member 23 of the steering post, the handle 25 and the steering link 26 constitute a parallel link mechanism so that the handle 25 may maintain a constant angle of inclination even if the position of the handle 25 is moved up and down according to the riding position of a driver P.

Figure 13:
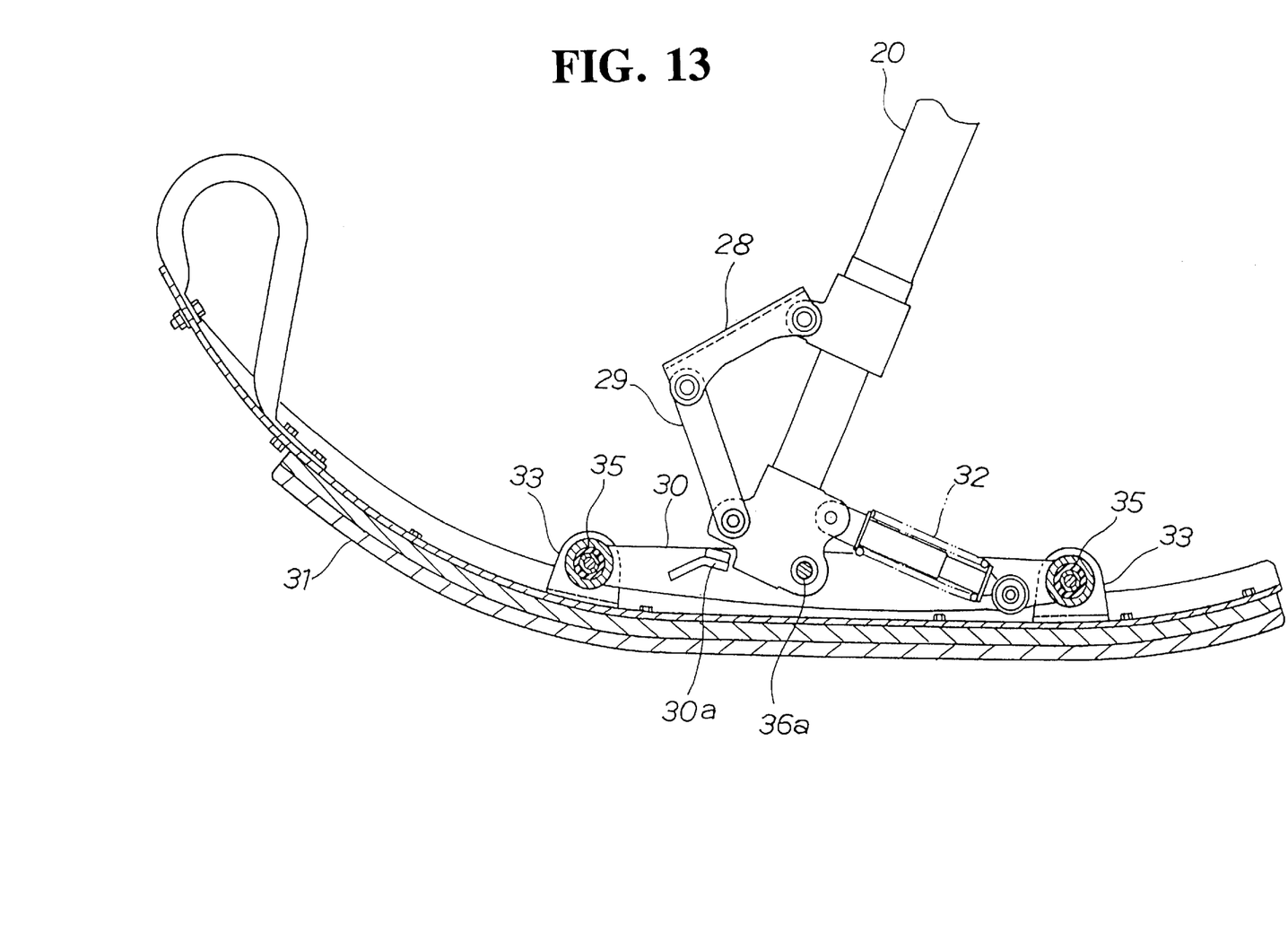
FIG. 13 is an enlarged side elevation showing a structure of the front lower portion of a snowmobile.

Further, the inner and outer cylinders of the front cushion unit 20 transmit the steering force through links 28 and 29. To this front cushion unit 20, there is attached through a bracket 30 a front ski 31. This front ski 31 has its rocking angle regulated with respect to the front cushion unit 20 by a sub-cushion (or bias member) 32 and a stopper 30a (as shown in FIG. 13) attached to the bracket 30 and is biased upward to the front by the spring force of the sub-cushion 32.

Figure 3:
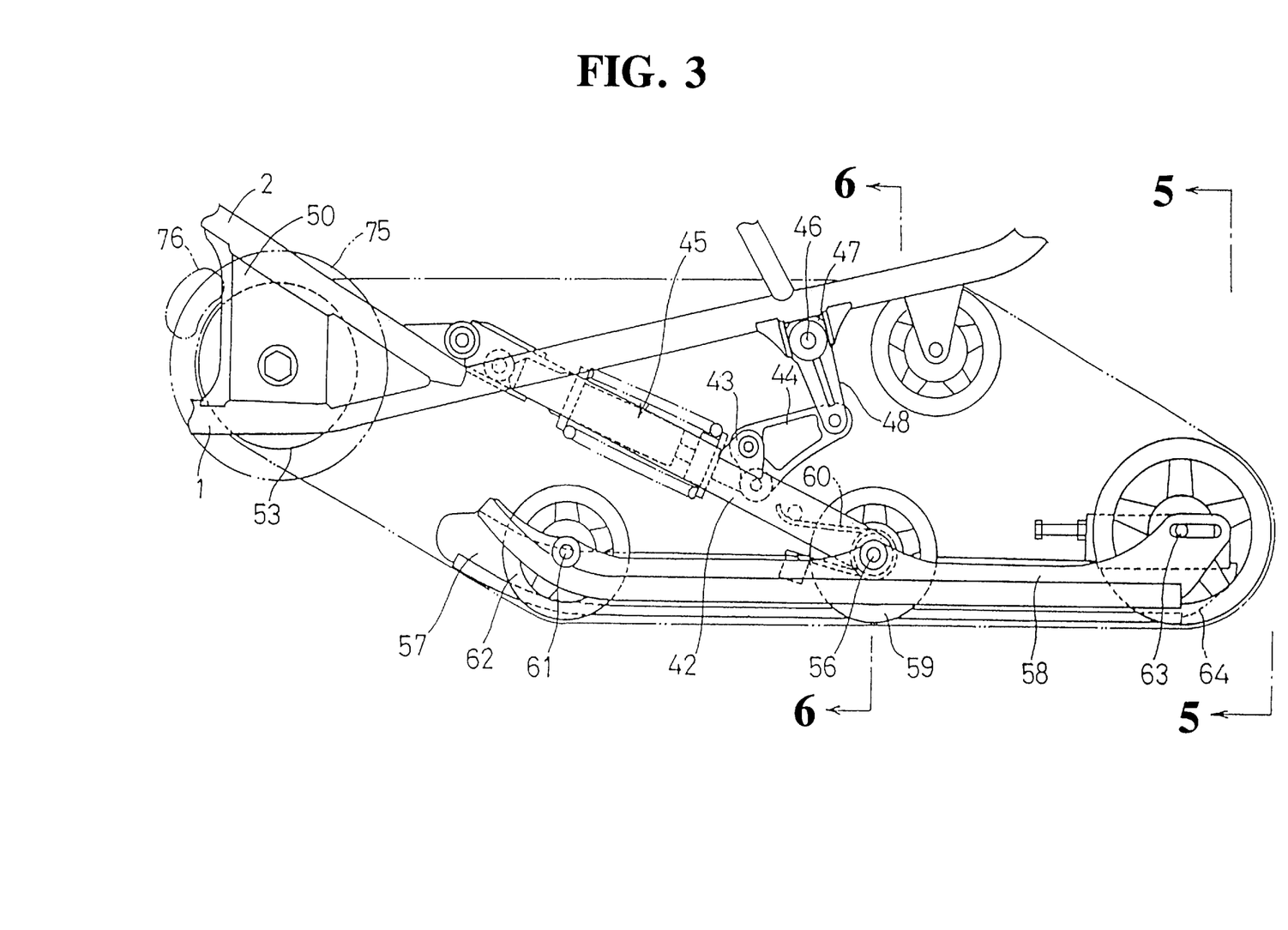
FIG. 3 is an enlarged side elevation showing the structure of the rear lower portion of the same snowmobile shown in FIG. 1.
Figure 4:
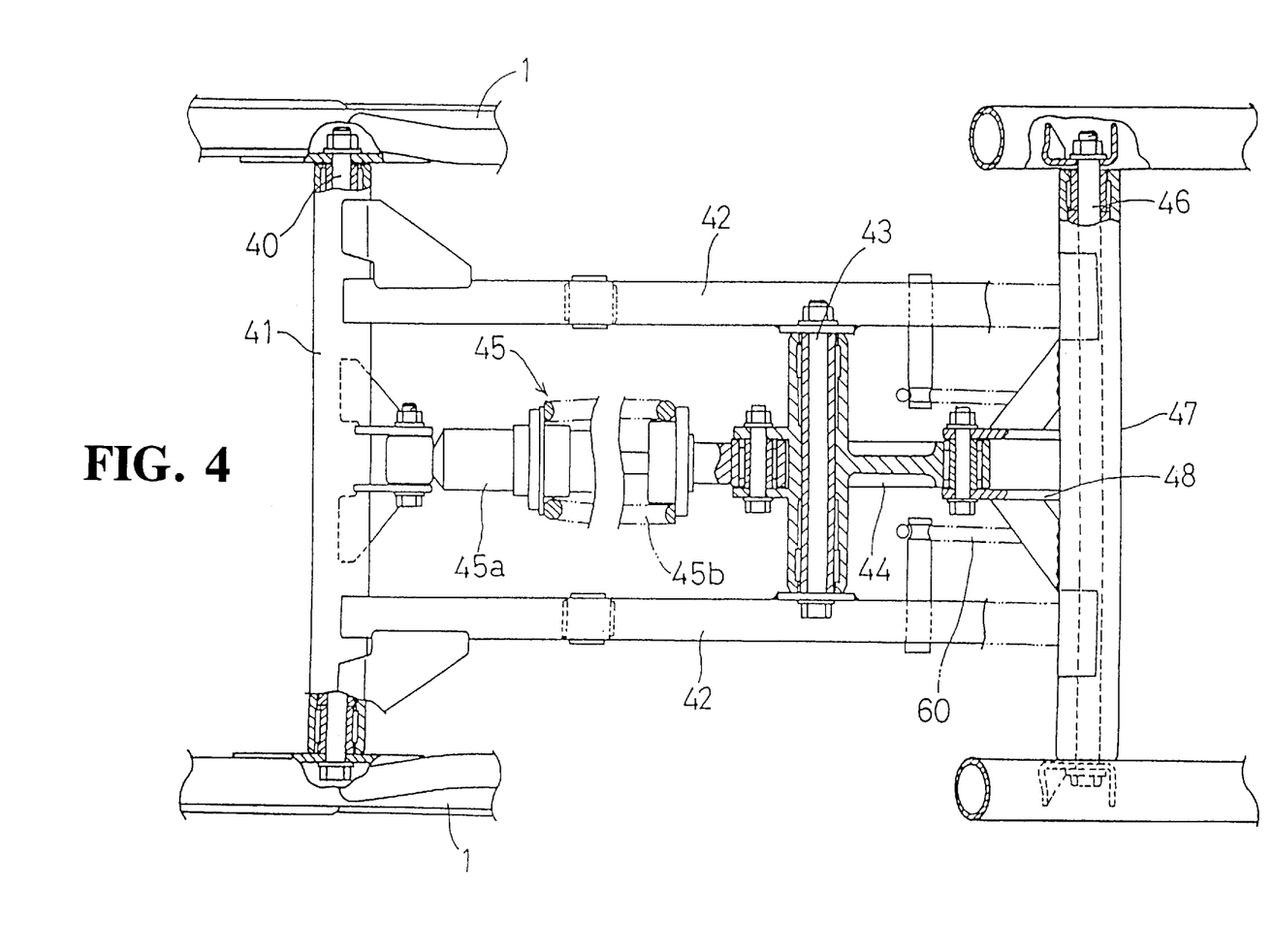
FIG. 4 is a view showing the structure of the swing arm assembly.

Next, the drive line will be described with reference to FIGS. 3 to 5.

Between the intermediate portions of the right and left main frames 1 and 1, there is mounted a shaft 40, on which a cross pipe 41 for the swing arms is rotatably supported. To this cross pipe 41, there are fixed the front end portions of a pair of right and left swing arm main pipes 42 and 42.

Between the intermediate portions of these paired swing arm main pipes 42 and 42, there is mounted a shaft 43, on which a triangular link 44 is rotatably supported.

To the center of the cross pipe 41 between the front end portions of the aforementioned paired right and left swing arm main pipes 42 and 42, there is connected the front end portion 45a of a rear cushion unit 45, the rear end portion 45b of which is connected to one corner portion of the triangular link 44. On the intermediate portions of the right and left main frames 1 and 1, there is mounted a shaft 46, on which a cross pipe 47 is rotatably supported. To this cross pipe 47, there is attached the upper end portion of a link 48, the lower end portion of which is connected to another corner portion of the triangular link 44.

With this construction, there is established a progressive link mechanism in which the rear cushion has its stroke progressively increased as the rear end of the swing arm rocks upward.

Figure 5:
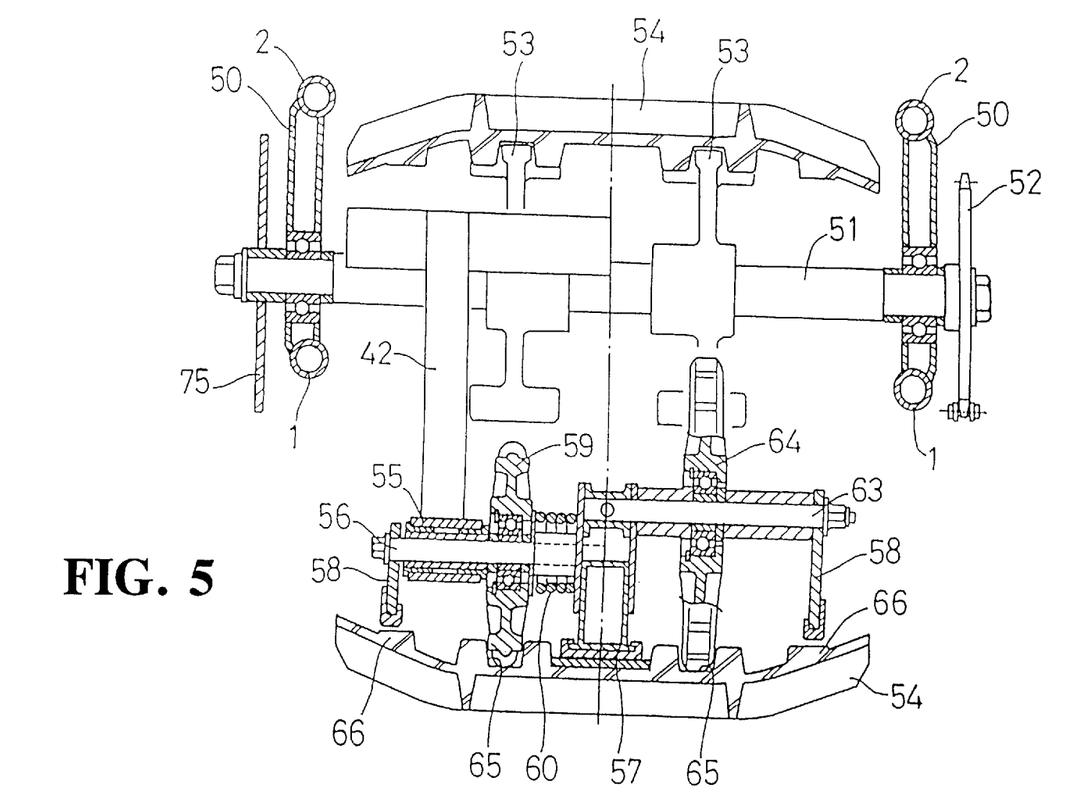
FIG. 5 is a righthand side view taken in the direction of line 5—5 of FIG. 3, and a lefthand side view taken in direction of line 6—6 of FIG. 3.

At portions near the intersections between the main frame 1 and the upper frame 2, there are disposed gusset plates 50, between which a drive shaft 51 is rotatably borne as shown in FIG. 5. On one end of this drive shaft 51, there is fixed a sprocket 52 which is connected through a chain to the output shaft of the transmission case 6. On the other end of the drive shaft 51 there is fixed a brake disc 75, near which is disposed a brake caliper 76, as shown in FIG. 3. To the intermediate portion of the drive shaft 51, moreover, there is splined a drive wheel 53 which has its outer circumference formed with a gear portion meshing with the corrugations formed on the inner surface of a crawler belt 54.

Between the rear end portions of the right and left swing arm main pipes 42 and 42, there is interposed a bearing 55, in which a shaft 56 is rotatably borne. On the central portion of this shaft 56, there is fixed a main slide rail 57 which extends in the longitudinal direction. On the outer end portions of the shaft 56, there are fixed a pair of right and left side slide rails 58 and 58.

Inside the side slide rails 58 of the shaft 56 a guide wheel 59 is rotatably mounted, inside which is disposed a spring 60 for urging the front portion of the main slide rail 57 downward. Between the main slide rail 57 and the front end portions of the side slide rails 58 there is mounted a shaft 61, on which a guide wheel 62 is rotatably mounted. Between the main slide rail 57 and the rear end portions of the side slide rails 58 there is mounted a shaft 63, on which a guide wheel 64 having a larger diameter is rotatably mounted such that its position can be adjusted.

The guide wheels 59, 62 and 64 are fitted in grooves 65 which are formed in the inner surface of the crawler belt 54. Moreover, the main slide rail 57 has its lower surface formed to leave a small gap from the central inner surface of the crawler belt 54 whereas the side slide rails 58 have their lower surface formed to leave small gaps from ridges 66 which are formed on the lateral outer ends of the crawler belt 54.

Figure 2:
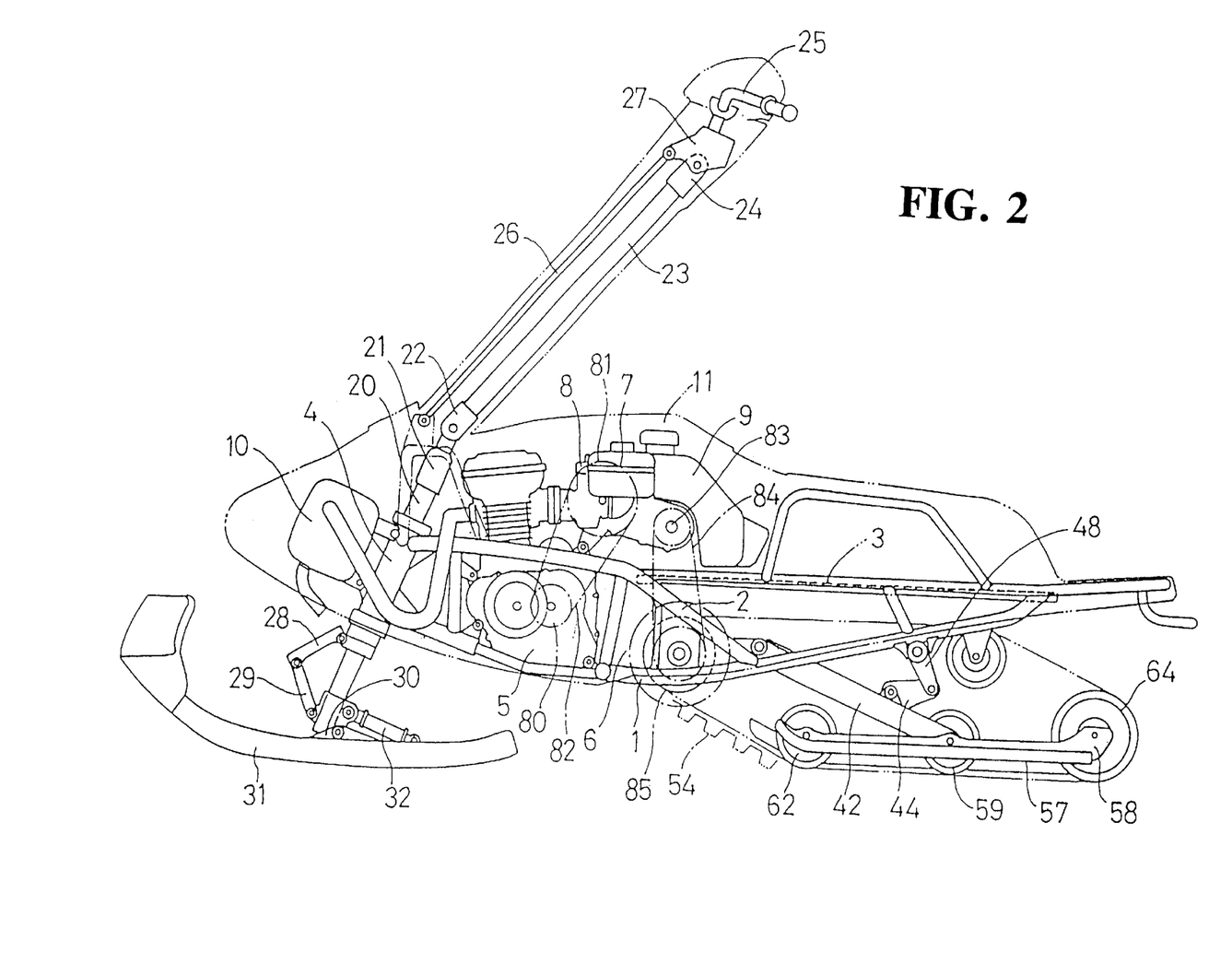
FIG. 2 is a perspective view showing the inside of a body cover of the snowmobile shown in FIG. 1;.

Thus, when the engine 5 is started, its drive force is transmitted to a drive pulley 80 of the belt converter, as shown in FIG. 2. The drive force rotates a driven pulley 81 through a belt 82 which is tensed between the drive pulley 80 and the driven pulley 81. This rotation of the driven pulley 81 is transmitted to an idle shaft 83. Then, the drive shaft 51 is rotated through a chain 84 so that the crawler belt 54 is driven to operate the snowmobile. In the case where the snowmobile operates on a soft snow surface, the crawler belt 54 sinks in the snow surface. At this time, the crawler belt 54 has its outer end portions brought into abutment against the lower surfaces of the side slide rails 58 to apply a uniform facial pressure thereby to increase the driving force to be transmitted to the crawler belt 54.

In the case where the snowmobile operates on a considerably hard snow surface, on the other hand, the gaps between the lower surfaces of the side slide rails 58 and the inner surface of the crawler belt 54 are kept to reduce the running resistance.

Figure 6:
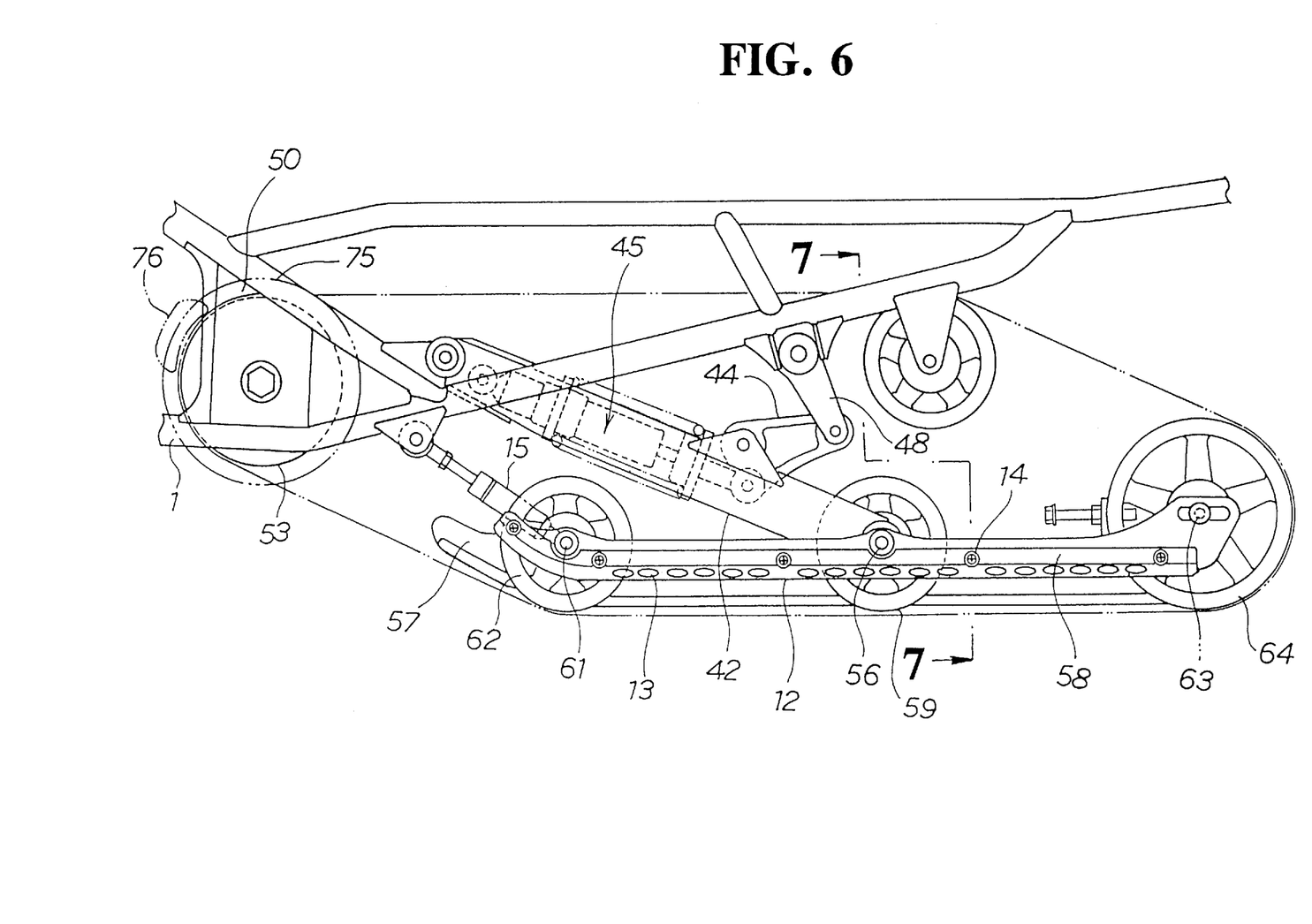
FIG. 6 is an enlarged side elevation showing the structure of the rear lower portion of a snowmobile according to another embodiment of the present invention.
Figure 7:
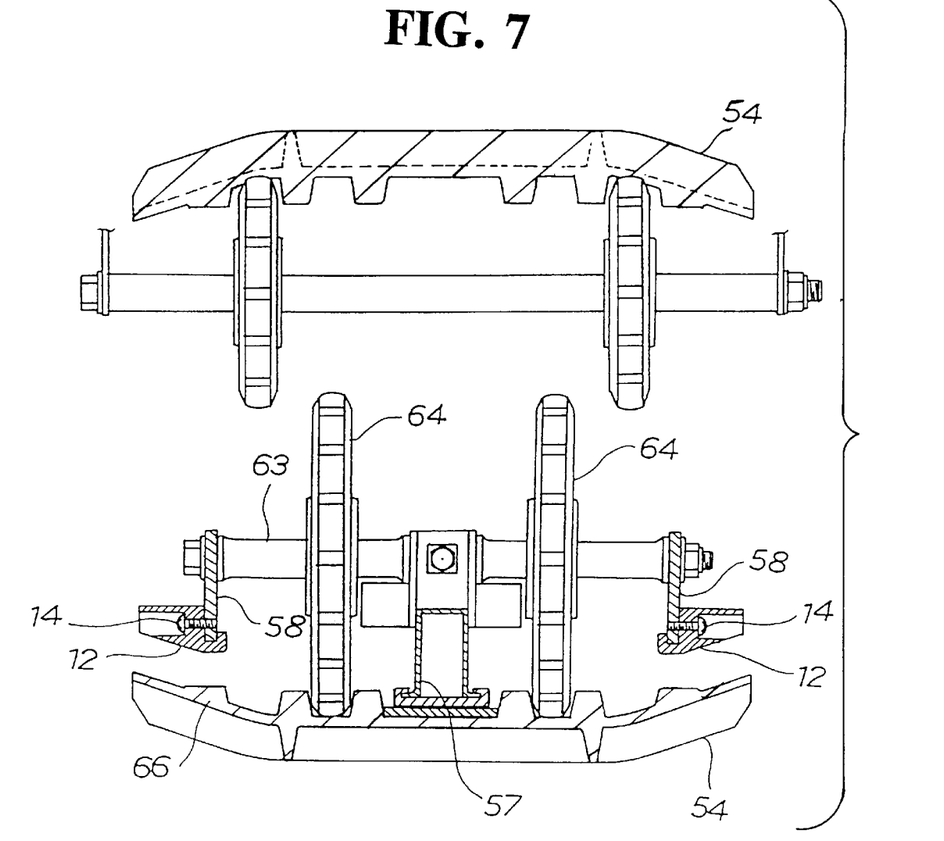
FIG. 7 is a section taken in the direction of the arrows 7—7 of FIG. 6.

FIG. 6 is an enlarged side elevation showing a structure of the rear lower portion of a snowmobile according to another embodiment, and FIG. 7 is a section taken in the direction of the arrows 7—7 of FIG. 6. The portions identical to those of FIGS. 1 to 5 are designated by the same reference numerals.

In this embodiment, the side slide rail 58 has its slider 12 formed to have its bottom surface extending outwardly complementary to the ridge 66 forming the inner surface of the crawler belt 54 that its leading end may coincide with the outer end surface of the crawler belt 54. On the other hand, the slider 12 is made of a resin material and is formed with a plurality of elliptical holes 13, which are spaced at a predetermined interval in the longitudinal direction, so that its weight may be reduced. Moreover, the slider 12 is fastened at several portions to the side slide rail 58 by means of screws 14, as shown.

With such a construction of the slider 12, the crawler belt 54 can have its outer end surface effectively pressed against the surface of the snow at the time of banking the snowmobile body so that the turning criticality and the drivability of the snowmobile are improved. Moreover, since the slider 12 has a wide contact area with the inner surface of the crawler belt 54, the contact pressure is dispersed to improve the wear lifetime.

In this embodiment, moreover, a pair of right and left dampers 15 are interposed between the main frame 1 and the shaft 61 to regulate the rocking range of the assembly of the main slide rail 57, the side slide rails 58 and the guide wheels 59, 62 and 64, thereby improving the drivability of the snowmobile.

Figure 8:
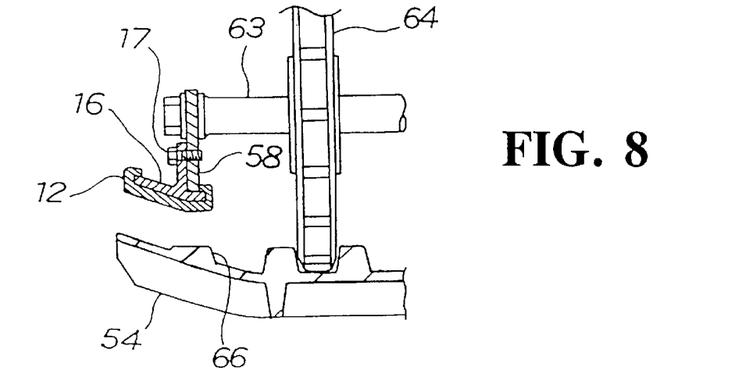
FIG. 8 is a modification of a slider.

FIG. 8 shows a modified embodiment of the slider, wherein like parts are designated by like reference numerals with respect to FIG. 7. In this embodiment, the resin slider 12 is inserted into a T-shaped member 16 which is extrusion molded with aluminum, and is so fixed thereto by screws (not shown) that it may not come out. After this, the T-shaped member 16 is fixed to the side slide rail 58 at a plurality of portions by bolts 17. In this case, too, the slider 12 has a bottom side shape substantially identical to the inner side shape of the crawler belt 54 so that the leading end of the extended portion of the bottom surface of the slider 12 substantially coincides with the outer end surface of the crawler belt 54 as in the case of the previous embodiment.

Figure 9:
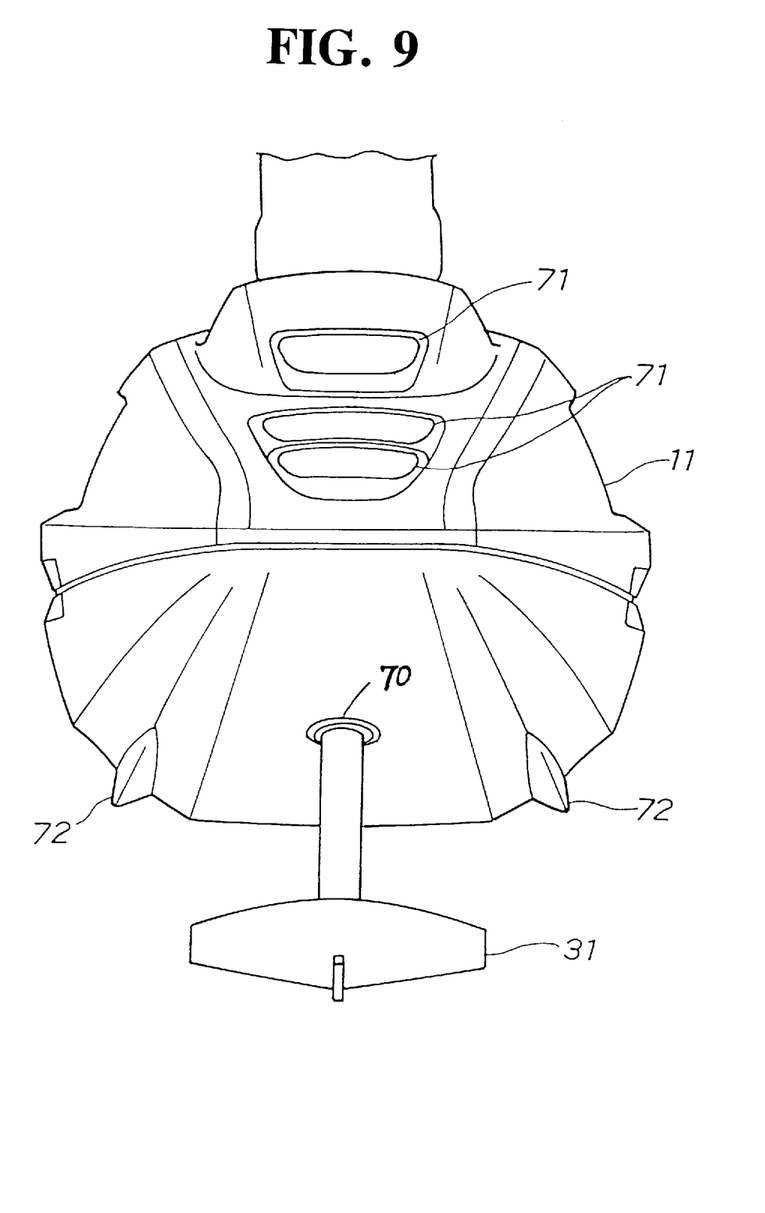
FIG. 9 is a view taken from the front of the body cover.

FIG. 9 is a front elevation of the body cover 11. This body cover 11 has at the center of its lower surface an opening 70 through which the front cushion unit 20 passes (refer to FIG. 2) and, in its front surface, cool air intake openings 71. Further, the body cover 11 is provided on the right and left sides of its lower surface with edge portions 72 which project downward in the longitudinal direction.

Figure 10:
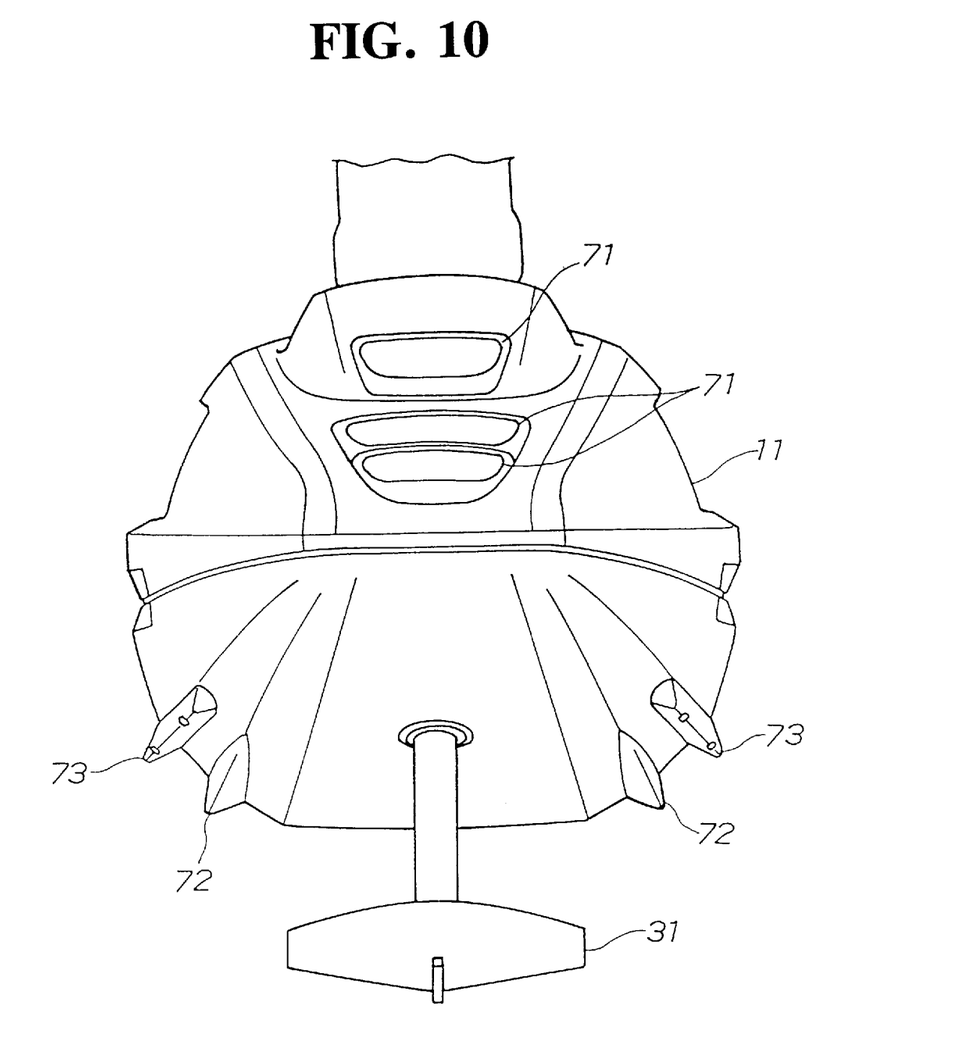
FIG. 10 is a view showing another embodiment of the body cover.

Further, FIG. 10 is a view showing another embodiment of the body cover. As shown, there may be provided edge portions 73 separately from the body cover 11.

Figure 11:
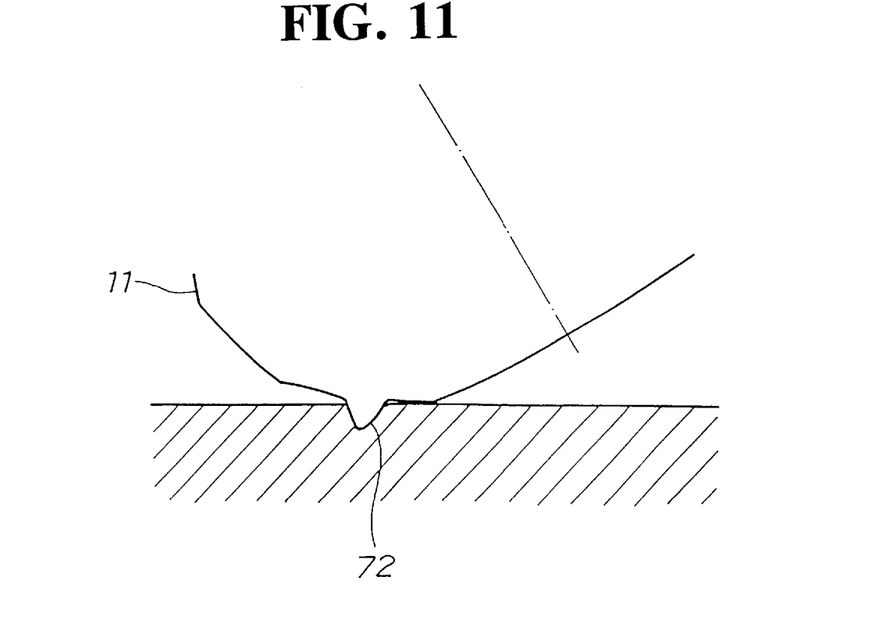
FIG. 11 a view illustrating the operation of the body cover, as shown in FIG. 9, at the time of banking of the snowmobile.
Figure 12:
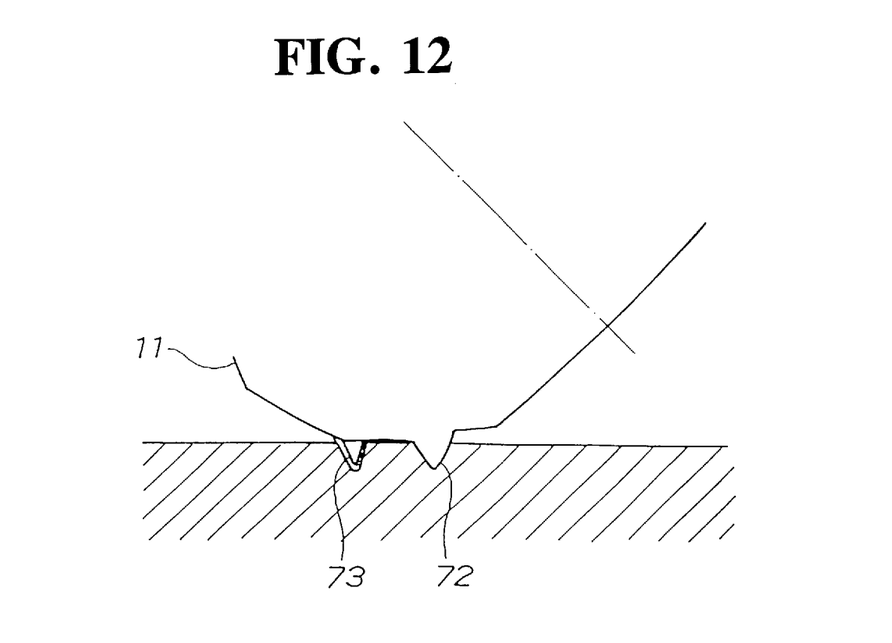
FIG. 12 is a view illustrating the operation of the body cover, shown in FIG. 10, at the time of banking of the snowmobile.

Since the edge portions 72 or 73 are provided on the right and left sides of the lower surface of the body cover 11, they can bite into the snow surface, as shown in FIGS. 11 and 12, when the snowmobile turns, to thereby compensate for the release of the snow-contact load of the front ski 31.

By changing the size of the edge portions 73, the biting action thereof at the time of turning can be adjusted.

Figure 14:
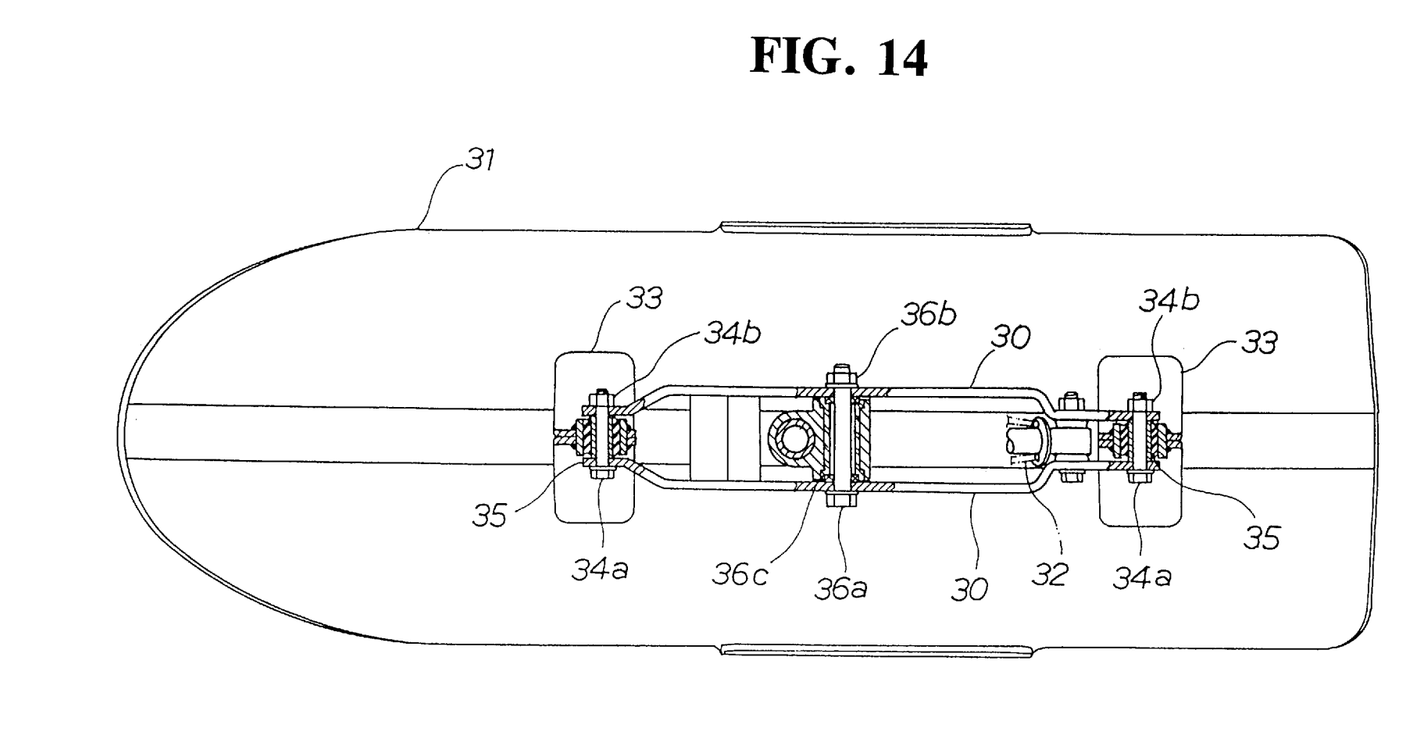
FIG. 14 is an enlarged top plan view showing a structure of the front lower portion of the snowmobile.

FIG. 13 is an enlarged side elevation showing the structure of the front lower portion of a snowmobile, and FIG. 14 is a top plan view of the same. In these figures, like parts are designated by like reference numerals with respect to FIGS. 1 through 5 and the description thereof is omitted.

In this embodiment, the bracket 30 supporting the lower end of the lower member 21 is not directly welded to the front ski 31 but is so attached thereto through mounting members 33 welded to the front ski 31 so as to turn and rock in the lateral direction.

The above construction will now be described in detail. Rubber bushings 35 and 35 are press-fitted in the mounting members 33, which are then welded to the front ski 31 on the longitudinal center line leaving a space substantially equal to the longitudinal end portions of the bracket 30. This bracket 30 is composed of two rectangular plates having bulging intermediate portions, and these rectangular plates are attached through their two longitudinal end holes to the mounting members 33 by means of bolts 34a and nuts 34b in symmetrical relationship with each other with respect to the center line of the front ski 31.

The lower member 21 has its lower end rotatably attached to the wider portion of the longitudinal intermediate portion of the bracket 30 by means of a bolt 36a, a nut 36b and a collar 36c. Moreover, the sub-cushion 32 is flexibly interposed between the lower end of the lower member 21 and the narrower rear portion of the bracket 30.

With this construction, the front ski 31 is allowed not only to turn with respect to the front cushion unit 20 but also to slightly rock in the banking direction of the snowmobile body by the elasticity of the rubber bushings.

As described above, according to the first aspect of the present invention, the slide rails include the main slide rail arranged at a midportion of the crawler belt, and the pair of right and left side slide rails arranged at the lateral side edges of the crawler belt so that when the crawler belt sinks into the snow surface to increase the running resistance of the snowmobile, the facial pressure against the snow surface becomes uniform to effectively transmit the driving force to the snowmobile.

Especially, if the gaps are formed between the lower surfaces of the side slide rails and the crawler belt, the running resistance at the time of ordinary running can be reduced to prevent the crawler belt from sinking into the snow surface.

The sliders are individually mounted on the lower surfaces of the side slide rails and have their bottom surfaces extended outward in the lateral direction along the inner side surfaces of the crawler belt to have substantially the same shape as that of the inner side surface of the crawler belt so that their leading ends may substantially coincide with the lateral outer end portions of the crawler belt. As a result, the crawler belt can be effectively depressed upon the snow surface effectively over the entire width thereof when the snowmobile banks, thereby improving the turning of the snowmobile and the drivability of the body thereof. Moreover, the area of the bottom surface of each of the sliders is wide so that the pressure generating at the time of contact with the crawler belt is dispersed to improve the wear lifetime 17 thereof.

According to the second aspect of the present invention the body cover of the snowmobile is equipped, on both right and left sides of the lower surface thereof, with the edge portions projecting downward along the longitudinal direction so that the edge portions enter into the snow at the time of turning thereby preventing the release of the snow contacting load on the front ski.

According to a third aspect of the present invention, elastic members are interposed between the lower member and the ski so that when the snowmobile is banked to turn, it can be instantly banked independently of the movement of the ski receiving the resistance from the snow surface so that the turning motion can be easily timed to provide a light drivability. If, on the other hand, the bracket and the ski is welded, the rigidity of the portion integral with the bracket is such that the stress concentrates on the front and rear of that portion. However, due to the mounting of the rubber bushings the stress is dispersed throughout the length of the ski.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A snowmobile having a crawler belt operatively connected to a drive wheel, slide rails and guide wheels supported by the slide rails, said slide rails comprising:
   a main slide rail arranged at approximately a midportion of the crawler belt; and
   a pair of right and left side slide rails arranged along outside side edges of the crawler belt, said guide wheels being arranged between said main slide rail and said side slide rails,
   wherein sliders are provided on lower surfaces of said side slide rails, said sliders having bottom surfaces extending outward in the direction of the width of said belt, with the bottom surface of each of said sliders having substantially the same shape as an inner side surface of said crawler belt so that leading ends of said sliders substantially coincide with lateral outer end portions of said crawler belt.

2. The snowmobile according to claim 1, wherein a gap is provided between a lower surface of each of said side slide rails and said crawler belt.

3. The snowmobile according to claim 1, wherein said bottom surfaces of said sliders are made of a resin material.

4. The snowmobile according to claim 1, wherein said bottom surfaces of said sliders include a plurality of holes which are spaced apart at a predetermined interval in the longitudinal direction.

5. The snowmobile according to claim 4, wherein said plurality of holes are elliptical.

6. The snowmobile according to claim 1, further comprising an inverted substantially T-shaped member attached to each of said side slide rails, said sliders being fixed to said T-shaped members.

7. The snowmobile according to claim 1, wherein said snowmobile further comprises a main frame, a swing arm assembly having a first end and a second end, said first end being pivotally attached to said main frame, said second end being pivotally attached to said slide rails.

8. The snowmobile according to claim 7, further comprising a cushion unit having a first end and a second end, said first end of said cushion unit being pivotally attached proximate said first end of said swing arm assembly, and a linkage assembly pivotally attached to said second end of said cushion unit.

9. The snowmobile according to claim 8, wherein said linkage assembly further comprises a triangular link, said triangular link having a first corner portion pivotally attached to said second end of said cushion unit, a second corner portion pivotally attached to said swing arm assembly, and a third corner portion pivotally attached to said main frame.

10. The snowmobile according to claim 9, and further including an intermediate link for providing said pivotal attachment of said third corner portion of said triangular link to said main frame, said intermediate link having a first end and a second end, said first end of said intermediate link pivotally attached to said main frame, and said second end of said intermediate link pivotally attached to said third corner portion of said triangular link.

11. The snowmobile according to claim 8, wherein said linkage assembly is configured wherein a stroke of said cushion unit is progressively increased as said swing arm assembly pivots upwardly.

12. A snowmobile having a crawler belt operatively connected to a drive wheel, slide rails and guide wheels supported by the slide rails, said slide rails including a pair of right and left side slide rails and a main slide rail arranged therebetween, said guide wheels being arranged between said main slide rail and said side slide rails, said snowmobile comprising:
   a body cover mounted on an outer side of said snowmobile, said body cover including a lower surface on right and left side portions with edge portions projecting downwardly along a longitudinal direction thereof, said edge portions providing stability when in contact with a surface during lateral inclination of the snowmobile,
   wherein said edge portions include first edge portions, said snowmobile further comprising second edge portions which project downwardly along said longitudinal direction and being attached to said right and left side portions laterally spaced from said first edge portions, said first and second edge portions providing stability when in contact with a surface during lateral inclination of the snowmobile.

13. A snowmobile having a crawler belt operatively connected to a drive wheel, slide rails and guide wheels supported by the slide rails, said slide rails including a pair of right and left side slide rails and a main slide rail arranged therebetween, said guide wheels being arranged between said main slide rail and said side slide rails, said snowmobile comprising:
   a body including a front portion;
   a front cushion unit attached to said body proximate the front portion thereof;
   a front ski; and
   pivotal attachment means for pivotally attaching said front ski to said front cushion unit,
   wherein said pivotal attachment means further includes a mounting member attached to said front ski, a bracket pivotally attached to said front cushion unit, and connection means including an elastic bushing for connecting said front ski to said bracket.

14. The snowmobile according to claim 13, wherein said pivotal attachment means allows said front ski to pivot independently about a longitudinal axis and an orthogonal lateral axis.

15. The snowmobile according to claim 14, further including a front ski cushioning unit operatively mounted between said front cushion unit and said bracket.

16. A snowmobile having a crawler belt operatively connected to a drive wheel, slide rails and guide wheels supported by the slide rails, said slide rails including a pair of right and left side slide rails and a main slide rail arranged therebetween, said guide wheels being arranged between said main slide rail and said side slide rails, said snowmobile comprising:

a body including a front portion;

a front cushion unit attached to said body proximate the front portion thereof;

a front ski; and pivotal attachment means for pivotally attaching said front ski to said front cushion unit, wherein said pivotal attachment means includes elastic members interposed between said front ski and said front cushion unit.

17. A snowmobile having a crawler belt operatively connected to a drive wheel, slide rails and guide wheels supported by the slide rails, said slide rails including a pair of right and left side slide rails and a main slide rail arranged therebetween, said guide wheels being arranged between said main slide rail and said side slide rails, said snowmobile comprising:

a body including a front portion;

a front cushion unit attached to said body proximate the front portion thereof;

a front ski; and pivotal attachment means for pivotally attaching said front ski to said front cushion unit, wherein said pivotal attachment means permits said front ski to pivot independently about a longitudinal axis and an orthogonal lateral axis.

* * * * *